United States Patent
Sutaria et al.

(10) Patent No.: US 7,063,812 B2
(45) Date of Patent: *Jun. 20, 2006

(54) CONSOLIDATION AND DENSIFICATION METHODS FOR FIBROUS MONOLITH PROCESSING

(75) Inventors: Manish P. Sutaria, Philadelphia, PA (US); Mark J. Rigali, Tucson, AZ (US); Ronald A. Cipriani, Tucson, AZ (US); Gregory J. Artz, Tucson, AZ (US); Anthony C. Mulligan, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/852,326

(22) Filed: May 24, 2004

(65) Prior Publication Data

US 2005/0001362 A1 Jan. 6, 2005

Related U.S. Application Data

(63) Continuation of application No. 10/005,241, filed on Dec. 4, 2001, now Pat. No. 6,740,286.

(60) Provisional application No. 60/251,132, filed on Dec. 4, 2000.

(51) Int. Cl.
*B28B 3/20* (2006.01)
*C04B 33/32* (2006.01)

(52) U.S. Cl. ................ 264/640; 264/641; 264/642

(58) Field of Classification Search ............ 264/638, 264/640–642, 652–653, 656, 460
See application file for complete search history.

(56) References Cited

U.S. PATENT DOCUMENTS 3,098,723 A * 7/1963 Micks .................. 428/389
4,772,524 A * 9/1988 Coblenz ................ 428/699
5,053,092 A * 10/1991 Lachman ............... 264/638
5,116,663 A * 5/1992 Fujimoto et al. ........ 428/209
5,120,688 A * 6/1992 Hsieh .................... 501/96.4
5,290,332 A * 3/1994 Chatterjee et al. ....... 65/17.3
5,294,387 A * 3/1994 Nakano et al. ......... 156/89.26
5,398,193 A * 3/1995 deAngelis ............... 700/119
5,588,997 A * 12/1996 Lysson et al. ........... 118/405
5,645,781 A * 7/1997 Popovic' et al. ......... 264/639
5,679,157 A * 10/1997 Milliman ................ 118/405
6,046,499 A * 4/2000 Yano et al. ............. 257/712
6,053,502 A * 4/2000 Hallenstvedt ........... 277/572
6,171,532 B1 * 1/2001 Sterzel ................... 264/43
6,193,001 B1 * 2/2001 Eyre et al. .............. 175/432
6,235,165 B1   5/2001 Wakasono
6,325,165 B1 * 12/2001 Eyre .................... 175/426
6,361,873 B1 * 3/2002 Yong et al. ............. 428/469
6,451,442 B1 * 9/2002 Sue et al. ............... 428/469
6,740,286 B1 * 5/2004 Sutaria et al. ........... 264/638
6,797,220 B1 * 9/2004 Mulligan et al. ......... 264/241
2002/0127384 A1 * 9/2002 Mulligan et al. ........ 428/293.7
2002/0154741 A1 * 10/2002 Rigali et al. ............ 378/144

OTHER PUBLICATIONS

Mark A. Janney, Stephen D. Nunn, Claudia A. Walls, Ogbemi O. Omatete, Randy B. Ogle, Glen H, Kirby, and April D. McMillan, "Gelcasting," *The Handbook of Ceramic Engineering*, 1998.

* cited by examiner

*Primary Examiner*—Steven P. Griffin
*Assistant Examiner*—Carlos Lopez
(74) *Attorney, Agent, or Firm*—Banner & Witcoff, Ltd.

(57) ABSTRACT

Methods for consolidation and densification of fibrous monolith composite structures are provided. Consolidation and densification of two- and three-dimensional fibrous monolith components having complex geometries can be achieved by pressureless sintering. The fibrous monolith composites are formed from filaments having at least a first material composition generally surrounded by a second material composition. The composites are sintered at a pressure of no more than about 30 psi to provide consolidated and densified fibrous monolith composites.

9 Claims, No Drawings

CONSOLIDATION AND DENSIFICATION METHODS FOR FIBROUS MONOLITH PROCESSING

CROSS-REFERENCE TO RELATED APPLICATIONS

This application is a continuation of U.S. application Ser. No. 10/005,241, filed Dec. 4, 2001, now U.S. Pat. No. 6,740,286, which is based on, and claims the benefit of, U.S. Provisional Application Ser. No. 60/251,132, filed on Dec. 4, 2000, and entitled "Consolidation And Densification Methods For Fibrous Monolith Processing."

This invention was made with U.S. Government support under grant Number DE-FC02-96CH10861 awarded by the Department of Energy, under grant Number NAS8-00081 awarded by the National Aeronautics and Space Administration, and under grant number DASG60-01-P-0050 awarded by the U.S. Army Space and Missile Defense. Accordingly, the Government may have certain rights in the invention described herein.

FIELD OF THE INVENTION

The present invention relates to processes for consolidation and densification of multiple-phase composite materials, including fibrous monolith composites.

BACKGROUND OF INVENTION

The process of fabricating high strength materials from powders such as ceramic and metal powders generally involves preparing "green" materials that include the powder and a thermoplastic binder of variable composition. As part of the fabrication process, the binder typically is removed from the material in a binder burnout step and the powder consolidated and densified in order to obtain a final structure having the desired properties, including strength and hardness. Methods of consolidation and densification include sintering processes such as, uniaxial hot pressing, hot isostatic pressing, overpressure sintering and atmospheric (pressureless) sintering.

Sintering processes, are critical in the fabrication of materials from ceramic and metal powders. Equipment used in pressure sintering processes including hot isostatic pressing (HIP) and uniaxial hot pressing must be designed to accommodate the high temperatures and high pressures associated with these sintering methods. Purchase, operation and maintenance costs for the HIP and uniaxial hot press equipment may be high as a result of the need to incorporate vessels capable of withstanding high pressures or hydraulic controlled rams into their respective designs. There are also additional costs in addressing safety requirements and designs for the safe and reliable operation of high pressure equipment. Additionally, the capacity of HIP and uniaxial hot press equipment is limited by these requirements. Thus, production volume capabilities are reduced, which further increases production costs. Furthermore, pressing is generally limited and cannot be used effectively with three-dimensional structures having more complex geometries.

Pressureless sintering furnaces generally are less expensive to purchase, operate and maintain as compared to equipment for pressure sintering. They also provide larger production volume capabilities and lower overall production costs. However, an important disadvantage associated with pressureless sintering is the potential inability to achieve effective sintering of a material in the absence of pressure.

Fibrous monoliths (FMs) are a unique class of structural ceramics. FMs are monolithic ceramics that are manufactured by powder processing techniques using inexpensive raw materials. Methods of preparing FM filaments are known. U.S. Pat. No. 5,645,781 describes methods of preparing FM composites by extrusion of filaments having controlled texture. As a result of the combination of relatively low costs of manufacture and benefits of enhanced materials performance, FMs have been used in a wider range of applications than heretofore typical for ceramics. Fibrous monoliths typically have been formed to various fibrous textures. For example, FM filaments have been woven into thin, planar structures. Alternatively, the filaments have been formed into three-dimensional structures having complex geometries.

Generally, the macroarchitecture of an FM composite includes a plurality of filaments each including a primary phase in the form of elongated polycrystalline cells surrounded by at least a thin secondary phase in the form of a cell boundary. The material selected for the cell phase differs from the material selected for the cell boundary phase in type and/or composition. Thus, the various materials comprising a FM composite each have different material properties.

This "multi-phase" nature of FM composites, along with the possibility that the composites are formed into complex structures, can increase the difficulties encountered when attempting to sinter such composites. Significantly, when two or more materials are used and are to be maintained essentially separate from each other in a composite component, the ability to effectively sinter the FM composite component can be severely limited or even prevented. Because the material properties of the two phases differ, the range of physical and chemical conditions that lead to effective sintering of the composite can be restricted. The difficulty in identifying an effective sintering regime increases further as additional materials are included in the composite. Moreover, the potential for unfavorable interactions between materials that can limit sinterability increases as additional materials are added to the composite.

There remains a need for more efficient, cost-effective sintering processes that can be utilized during fabrication of fibrous monolith composite structures, particularly those having complex geometries.

SUMMARY OF THE INVENTION

The present invention overcomes the problems encountered in conventional methods by providing efficient, cost-effective processes for consolidation and densification of composites formed of more than one composition. More specifically, the present invention provides methods of pressureless sintering that are effective for sintering fibrous monolith composite structures, including those having complex geometries. Pressureless sintering of FM composites provides for the consolidation and densification of two- and three-dimensional components in less time and at a lower cost as compared to other sintering processes. Additionally, FM composites with geometries too complicated to be processed by uniaxial hot press techniques can be sintered in accordance with the method of the present invention.

DETAILED DESCRIPTION OF THE INVENTION

The present invention relates to methods of consolidating and densifying ceramic composite components by pressureless sintering. Components that can be consolidated and densified in accordance with the invention include those formed of composites that have two or more materials present in essentially separate phases. Such composites include fibrous monolith (FM) composites, which are made up of a plurality of filaments having a core phase that is surrounded by a shell phase.

In a pressureless sintering process, composites are heated to high temperatures without high pressure in a large volume, high temperature furnace. In comparison to various pressure sintering processes, pressureless sintering significantly lowers the overall production cost of FM composites, in part due to lower equipment purchase, operation and maintenance costs. Pressureless sintering also provides large production volume capabilities, so that mass production of FM components is possible. The processes of the present invention thus provide increased effectiveness and efficiencies in the overall fabrication of FM composite components.

As used herein, "fibrous monolithic composite" and "fibrous monolith" are intended to mean a ceramic composite material that includes a plurality of monolithic fibers, or filaments, each having at least a cell phase surrounded by a boundary phase but may include more than one core and/or shell phase. Fibrous monoliths exhibit the characteristic of non-brittle fracture, such that they provide for non-catastrophic failure.

As used herein, "cell phase" is intended to mean a centrally located primary material of the monolithic fiber that is dense, relatively hard and/or strong. The cell phase extends axially through the length of the fiber, and, when the fiber is viewed in cross-section, the cell phase forms the core of the fiber. The "cell phase" also may be referred to as a "cell" or "core".

As used herein, "boundary phase" is intended to mean a more ductile and/or weaker material that surrounds the cell phase of a monolithic fiber in a relatively thin layer. The boundary phase is disposed between the various individual cell phases, forming a separate layer between the cell phase and surrounding cell phases when a plurality of fibers are formed in a fibrous monolithic composite. The "boundary phase" also may be referred to as a "shell," "cell boundary," or "boundary".

Fibrous monoliths ("FMs") are a unique class of structural ceramics that have mechanical properties similar to continuous fiber reinforced ceramic composites (CFCCs). Such properties include relatively high fracture energies, damage tolerance, and graceful failures. In contrast to CFCCs, FMs can be produced at a significantly lower cost. FMs, which are monolithic ceramics, generally are manufactured by powder processing techniques using inexpensive raw materials. As a result of the high performance characteristics of FMs and the low costs associated with manufacture of FMs, FMs are used in a wider range of applications than heretofore typical for ceramic composites. Thus, FMs are used to form structures having a great variety of shapes and sizes ranging from rather simple essentially two-dimensional structures to very complex three-dimensional structures.

The macroarchitecture of an FM composite generally includes multiple filaments each comprising at least two distinct materials—a primary phase in the form of elongated polycrystalline cells separated by a thin secondary phase in the form of cell boundaries. The primary or cell phase typically consists of a structural material of a metal, metal alloy, carbide, nitride, boride, oxide, phosphate or silicide and combination thereof. The cells are individually surrounded and separated by cell boundaries of a tailored secondary phase. Powders that may be used in the secondary phase include compounds to create weak interfaces such as fluoromica, and lanthanum phosphate; compounds to create porosity in a layer which function to create a weak interface; graphite powders and graphite-containing powder mixtures; and hexagonal boron nitride powder and boron nitride-containing powder mixtures. If a metallic debond phase is desired, reducible oxides of metals may be used, e.g., nickel and iron oxides, or powders of metals, e.g., nickel, iron, cobalt, tungsten, aluminum, niobium, silver, rhenium, chromium, or their alloys.

Advantageously, powders which may be used in the cell and/or boundary phase composition to provide the green matrix filament include diamond, graphite, ceramic oxides, ceramic carbides, ceramic nitrides, ceramic borides, ceramic silicides, metals, and intermetallics. Preferred powders for use in that composition include aluminum oxides, barium oxides, beryllium oxides, calcium oxides, cobalt oxides, chromium oxides, dysprosium oxides and other rare earth oxides, hafnium oxides, lanthanum oxides, magnesium oxides, manganese oxides, niobium oxides, nickel oxides, tin oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, tantalum carbides, titanium carbides, uranium carbides, tungsten carbides, zirconium carbides; aluminum nitrides, cubic boron nitrides, hexagonal boron nitrides, hafnium nitride, silicon nitrides, titanium nitrides, uranium nitrides, yttrium nitrides, zirconium nitrides; aluminum boride, hafnium boride, molybdenum boride, titanium boride, zirconium boride; molybdenum disilicide; lithium and other alkali metals and their alloys; magnesium and other alkali earth metals and their alloys; titanium, iron, nickel, chromium, cobalt, molybdenum, tungsten, hafnium, rhenium, rhodium, niobium, tantalum, iridium, platinum, zirconium, palladium and other transition metals and their alloys; cerium, ytterbium and other rare earth metals and their alloys; aluminum; carbon; lead; tin; and silicon.

Compositions comprising the cell phase differ from those comprising the boundary phase in order to provide the benefits generally associated with FMs. For example, the compositions may include formulations of different compounds (e.g., HfC for the cell phase and WRe for the boundary phase or WC—Co and W—Ni—Fe) or formulations of the same compounds with differing component amounts (e.g., WC-3% Co for the cell phase and WC-6% Co for the boundary phase) so long as the overall properties of the compositions are not the same. For example, the compositions can be selected so that no excessively strong bonding occurs between the two phases in order to limit crack deflection.

The cell boundary phase may be selected to create pressure zones, microcrack zones, ductile-phasezones, or weak debond-type interfaces in order to increase the toughness of the composite. For example, low-shear-strength materials such as graphite and hexagonal boron nitride make excellent week debond-type cell boundaries and are present in $Si_3N_4$/BN and SiC/Graphite FM composites. The weak BN and graphite interfaces deflect cracks and determine thereby preventing brittle failure of these composites and increasing their fracture toughness. As a result, FM structures exhibit fracture behavior similar to CFCCs, such as C/C and SiC/SiC composites, including the ability to fail in a non-catastrophic manner.

Fibrous monolith composites are fabricated using commercially available ceramic and metal powders using a process for converting ordinary ceramic powder into a "green" fiber that include the powder, a thermoplastic polymer binder and other processing aids. Various methods of preparing fibrous monolithic filaments are known in the art, including the methods disclosed in U.S. Pat. No. 5,645,781, which is incorporated by reference herein in its entirety. Generally, the fibrous monolithic filaments that form the composite structures are prepared by first separately blending powders, polymer binders and possibly one or more processing aids as the starting materials for the different phases of the filaments. The materials of the cell and boundary are selected to provide the final structures with predetermined properties. The starting materials are selected from a thermodynamically compatible set of materials available as sinterable powders.

The fiber is compacted into the "green" state to create the fabric of elongated polycrystalline cells that resemble a fiber after sintering or hot pressing. Once the green composite fiber is fabricated it can be formed using any method known to those skilled in the art into the shape of the desired component having, for example, conventional composite architecture (e.g., uniaxial lay-up, biaxial lay-up, woven fabric, etc.).

In final, finishing processes, the thermoplastic binder is removed in a binder burnout step. The component is sintered to obtain a fully consolidated and densified final structure. The FM composite component is sintered in a pressureless, or essentially pressureless, furnace. The component is heated at temperatures and for a time effective for obtaining a predetermined degree of sintering. The final resultant FM structure has desired properties such as strength, hardness and fracture toughness.

Operating parameters of pressureless sintering are adjusted according to the material characteristics of the particular FM composite being sintered. These parameters are dictated in large part by the melting points of the constituents, their average particle sizes, as well as presence of sintering aids. Gases such as $N_2$ and inert gases such as Ar can be used in the sintering furnace to control the sintering environment. An applied overpressure of these gases (e.g., an overpressure of 6 psi applied in the cold state or an overpressure of 30 psi in a hot state) may be used to improve sintering.

Sintering aids may be blended with one or more of the starting materials to enhance the sinterability of the FM composite. Sintering aids are selected to be physically and chemically compatible with the starting materials while possessing material properties such as lower melting points, higher surface energy and/or higher atomic mobility. In an example of liquid phase sintering, aluminum oxide and yttrium oxide are added to silicon nitride and at the sintering temperature of the system, a low viscosity melt is formed that effectively bonds the silicon nitride grains together. Compositions that may be used as sintering aids include aluminum oxide and yttrium oxide with silicon nitride, silicon carbide with zirconium carbide, zirconium metal with zirconium diboride, and hafnium hydride and carbon with hafnium carbide. The sintering aids are blended in amounts effective for enhancing consolidation and densification of the FM composite during sintering to provide a final FM composite structure with the desired FM properties.

In other embodiments, alternative methods of preparing FM filaments and composite materials may be utilized. Alternative compositions and methods, including those described in the co-pending U.S. patent applications listed in Table 1, which are incorporated by reference herein in their entireties, are contemplated for use with the present invention.

TABLE 1

| TITLE | INVENTORS | FILING DATE |
|---|---|---|
| ALIGNED COMPOSITE STRUCTURES FOR MITIGATION OF IMPACT DAMAGE AND RESISTANCE TO WEAR IN DYNAMIC ENVIRONMENTS | Anthony C. Mulligan Mark J. Rigali Manish P. Sutaria Dragan Popovich | Dec. 4, 2001 |
| METHODS AND APPARATUS FOR PREPARATION OF THREE-DIMENSIONAL BODIES | Anthony C. Mulligan Mark J. Rigali Manish P. Sutaria Gregory J. Artz Felix H. Gafner K. Ranji Vaidayanathan | Dec. 4, 2001 |
| COMPOSITE STRUCTURES FOR USE IN HIGH TEMPERATURE APPLICATIONS | Mark J. Rigali Manish P. Sutaria Greg E. Hilmas Anthony C. Mulligan Marlene Platero-AllRunner Mark M. Opeka | Dec. 4, 2001 |
| COMPOSITIONS AND METHODS FOR PREPARING MULTIPLE-COMPONENT COMPOSITE MATERIALS | Mark J. Rigali Manish P. Sutaria Felix Gafner Ron Cipriani Randy Egner Randy C. Cook | Dec. 4, 2001 |
| MULTI-FUNCTIONAL COMPOSITE STRUCTURES | Anthony C. Mulligan John Halloran Dragan Popovich Mark J. Rigali Manish P. Sutaria K. Ranji Vaidyanathan Michael L. Fulcher Kenneth L. Knittel | Dec. 4, 2001 |

EXAMPLES

The following examples are intended to illustrate the present invention and should not be construed as in any way limiting or restricting the scope of the present invention.

Example 1

During hot-pressing of a $Si_3N_4$/BN FM composite, the BN cell boundary included glassy phases that were believed to result from the migration of sintering aids from the $Si_3N_4$ phase into the BN phase. This migration of glass appeared to aid the consolidation of the FM composite.

Sintering aids are blended directly with the BN phase to aid in the consolidation process during pressureless sintering. Equivalent amounts of sintering aids as compared to the amount of glass present in a dense $Si_3N_4$/BN FM sample that was hot pressed are blended with the BN and thermoplastics composition during green processing. Sintering aids for use with $Si_3N_4$/BN FM composites are listed in Table 2. The sintering aids listed in Table 2 are blended with BN, while standard sintering aids (6 wt % $Y_2O_3$ and 4 wt % $Al_2O_3$) are blended with $Si_3N_4$.

TABLE 2

| System | Weight Percentages | | | | | |
|---|---|---|---|---|---|---|
| | BN | $Al_2O_3$ | $Y_2O_3$ | $SiO_2$ | Borosilicate | $Si_3N_4$ |
| BN/YAS Glass* | 86.08 | 2.72 | 8.14 | 3.05 | — | — |
| BN/YAS Glass* + $Si_3N_4$ | 81.78 | 2.58 | 7.73 | 2.90 | — | 5.00 |
| BN/Borosilicate Glass | 75.00 | — | — | — | 25.00 | — |

*YAS Glass = Ytttria Alumina Silica Glass

An amount of $Si_3N_4$ (about 5 wt. %) is added with the sintering aids in the second system listed in Table 2, because $Si_3N_4$ is easily sintered and may enhance the sintering of BN in the FM system.

$Si_3N_4$/BN FM test bars with BN containing the glass sintering aids are fabricated. To minimize porosity, the test bars are warm isostatically pressed prior to pressureless sintering. The test bars are placed in a binder burnout furnace to remove polymer binders and pressureless sintered at 1750° C.

Example 2

Sintering experiments were conducted with ZrC/WRe FM composites to establish consolidation conditions for more complex three-dimensional components such as bladed discs, nozzles and thrusters. The samples were placed in graphite crucibles and heated to temperature in a graphite furnace in an argon atmosphere. The following sintering schedule was used for the monolithic samples:

Room Temperature to 1200° C. at 25° C./min
1200° C. to 2000° C. at 3.3° C./min
Hold at 2000° C. for 120 min
2000° C. to 1000° C. at 10° C./min
1000° C. to Room Temperature The ZrC/WRe sample was sintered at 2000° C. for one hour. The results of the sintering experiments are shown in Table 3.

TABLE 3

| Sample | Sintering Temperature (° C.) | Theoretical Density | Density (g/cc) | % Theoretical |
|---|---|---|---|---|
| ZrC(5% HCS SiC) | 2000 | 6.52 | 5.71 | 88 |
| ZrC(10% HCS SiC) | 2000 | 6.35 | 5.57 | 88 |
| ZrC(15% HCS SiC) | 2000 | 6.18 | 5.50 | 89 |
| ZrC(20% HCS SiC) | 2000 | 6.00 | 5.60 | 93 |
| ZrC(15% PC SiC) | 2000 | 5.83 | 5.44 | 88 |
| ZrC(10% Zr) | 2000 | 6.66 | 5.00 | 75 |
| ZrC(5% HCS SiC) | 1950 | 6.52 | 5.13 | 79 |
| ZrC(10% HCS SiC) | 1950 | 6.35 | 5.01 | 79 |
| ZrC/WRe FM | 2000 | 6.82 | 8.62 | 80 |
| ZrC/WRe FM | 2100 | 7.10 | 8.62 | 82 |

These experiments demonstrate that relatively high densities may be achieved by sintering ZrC and ZrC/WRe FM composite samples. The porosity of the samples was essentially closed as evaluated using microscopic and scanning electron microscope (SEM) examinations. Thus, hot isostatic pressing of the samples produces parts at or very close to full theoretical density.

Example 3

This example illustrates the preparation of a pressureless sinterable multifilament zirconium carbide/boron nitride/zirconium carbide FM composite. Sinterable zirconium carbide powder with 15 volume percent silicon carbide powder is blended with copolymers and plasticizer to form a fibrous monolith core material according to the formulation of Table 4.

TABLE 4

| Material | Density (g/cc) | Volume % | Volume (cc) | Weight (g) |
|---|---|---|---|---|
| ZrC[1]-15% SiC[2] | 6.18 | 55.0% | 24.75 | 152.96 |
| EEA copolymer[3] | 0.93 | 32.0% | 14.4 | 13.39 |
| EAA copolymer[4] | 0.93 | 7.0% | 3.15 | 2.92 |
| MPEG-550[5] | 1.100 | 6.0% | 2.7 | 2.97 |

[1] ZrC is zirconium carbide from Cerac, Inc., designated as Z-1034

[2] SiC is silicon carbide from H. C. Starck Corporation, designated as UF-10

[3] EEA is ethylene-ethyl acetate copolymers from Union Carbide

[4] EAA is ethylene-acrylic acid copolymers from Union Carbide

[5] MPEG-550 is methoxypolyethylene glycol (average molecular weight of 550) (a plasticizer)

A "Brabender" mixing machine (from C. W. Brabender of South Hackensack, N.J.) is used to blend the above materials. The MPEG 550 is added to adjust the blending torque of the composition to approximately 200 kg-$m^2$.

In a separate process, boron nitride powder is blended with co-polymers and plasticizers to form the intermediate fibrous monolith boundary phase material according to the formulation shown in Table 5.

TABLE 5

| Material | Density (g/cc) | Volume % | Volume (cc) | Weight (g) |
|---|---|---|---|---|
| BN[6] | 2.27 | 50.0% | 42.5 | 96.48 |
| EEA copolymer[7] | 0.93 | 49.0% | 22.05 | 20.51 |
| MPEG-550[8] | 1.100 | 1.0% | 0.45 | 0.63 |

[6] BN is boron nitride from Advanced Ceramics Corporation, designated as HCP-BN

[7] EEA is ethylene-ethyl acetate copolymers from Union Carbide

[8] MPEG-550 is methoxypolyethylene glycol (average molecular weight of 550) (a plasticizer)

A "Brabender" mixing machine (from C. W. Brabender of South Hackensack, N.J.) is used to blend the above materials. The MPEG 550 is added to adjust the blending torque of the composition to approximately 100 kg-$m^2$.

In a separate process, sinterable zirconium carbide powder with 15 volume percent silicon carbide powder is blended with co-polymers and plasticizers to form the outermost layer of the fibrous monolith filaments according to the formulation shown in Table 6.

TABLE 6

| Material | Density (g/cc) | Volume % | Volume (cc) | Weight (g) |
|---|---|---|---|---|
| ZrC[9]-15% SiC[10] | 6.18 | 50.0% | 22.5 | 139.05 |
| EEA copolymer[11] | 0.93 | 40.0% | 18.0 | 16.74 |
| MPEG-550[12] | 1.100 | 10.0% | 4.5 | 4.95 |

[9]ZrC is zirconium carbide from Cerac, Inc., designated as Z-1034
[10]SiC is silicon carbide from H. C. Starck Corporation, designated as UF-10
[11]EEA is ethylene-ethyl acetate copolymers from Union Carbide
[12]MPEG-550 is methoxypolyethylene glycol (average molecular weight of 550) (a plasticizer)

A "Brabender" mixing machine (from C. W. Brabender of South Hackensack, N.J.) is used to blend the above materials. The MPEG 550 is added to adjust the blending torque of the composition to approximately 100 kg-m².

Example 4

A multifilament zirconium carbide/boron nitride/zirconium carbide controlled geometry feed rod was assembled using the materials of Example 3. A zirconium carbide feed rod was combined with a boron nitride shell. The zirconium carbide/boron nitride feed rod was loaded into an extrusion cylinder and extruded at 105° C. A 2 millimeter diameter zirconium carbide/boron nitride monofilament fiber was obtained and collected on a motor controlled spooler. The zirconium carbide/boron nitride monofilament fiber was cut into 70 segments of about 5.5 inches in length. The outermost zirconium carbide shell was loaded into a molding cylinder along with the 70 zirconium carbide/boron nitride monofilament fiber segments. The assembly was pressed to form a multifilament feed rod of ZrC/BN filaments bundled within a ZrC shell. The feed rod was extruded to form a continuous length of 2 mm zirconium carbide/boron nitride/zirconium carbide multifilament fiber. The multifilament fiber was then cut into 3 inch long segments and then arranged into a 1 inch wide by 3 inch long by 0.25 inch thick coupons and molded to provide a green fibrous monolith ceramic structure. Four green zirconium carbide/boron nitride/zirconium carbide fibrous monolith ceramic coupons were prepared. Three of the four coupons were placed in graphite crucibles and heated in a furnace in a nitrogen atmosphere to remove the binder in preparation for consolidation by pressureless sintering. The fourth coupon was placed in a graphite hot press die and heated in a furnace in a nitrogen atmosphere to remove the binder in preparation for consolidation by uniaxial hot pressing.

Two of the three zirconium carbide/boron nitride/zirconium carbide fibrous monolith ceramic coupons were consolidated by pressureless sintering in a nitrogen atmosphere using the following schedule:
Room temperature to 2000° C. at 21.39° C./minute
Hold at 2000° C. for 120 minutes
2000° C. to Room Temperature at 21.39° C./minute The third zirconium carbide/boron nitride/zirconium carbide fibrous monolith ceramic coupon was consolidated by pressureless sintering in a nitrogen atmosphere using the following schedule:
Room temperature to 1200° C. at 25° C./minute
1200° C. to 2100° C. at 10° C./minute
Hold at 2100° C. for 60 minutes
2100° C. to Room Temperature at 23.3° C./minute The conditions of consolidation for the four zirconium carbide/boron nitride/zirconium carbide fibrous monolith ceramic samples are presented in Table 7. Measured physical and mechanical properties of the four fibrous monolithic ceramic samples are provided in Table 8.

TABLE 7

| System | Molding Pressure (psi) | Consolidation Method | Consolidation Atmosphere | Consolidation Temperature (° C.) | Consolidation Pressure (ksi) |
|---|---|---|---|---|---|
| ZrC/BN/ZrC | 6,000 | Pressureless Sintering | Nitrogen | 2000 | 0.014 |
| ZrC/BN/ZrC | 12,000 | Pressureless Sintering | Nitrogen | 2000 | 0.014 |
| ZrC/BN/ZrC | 12,000 | Pressureless Sintering | Nitrogen | 2100 | 0.014 |
| ZrC/BN/ZrC | 3,000 | Hot Uni-axial Pressing | Nitrogen | 2200 | 4.0 |

TABLE 8

| System | Consolidation Method | Measured Fracture Stress (MPa) | % Theoretical Density (g/cc) |
|---|---|---|---|
| ZrC/BN/ZrC 6000 psi | Pressureless Sintering | 86 | 87.4 |
| ZrC/BN/ZrC 12000 psi | Pressureless Sintering | 110 | 86.5 |
| ZrC/BN/ZrC 12000 psi | Pressureless Sintering | 86. | 87.8 |
| ZrC/BN/ZrC 3,000 psi | Hot Uni-axial Pressing | 254 | 98.2 |

This experiment demonstrates that a ZrC/BN/ZrC fibrous monolith composite structure can be properly consolidated and densified by pressureless sintering.

Numerous modifications to the invention are possible to further improve the methods for consolidation and densification. Thus, modifications and variations in the practice of the invention will be apparent to those skilled in the art upon consideration of the foregoing detailed description of the invention. Although preferred embodiments have been described above and illustrated in the accompanying drawings, there is no intent to limit the scope of the invention to these or other particular embodiments. Consequently, any such modifications and variations are intended to be included within the scope of the following claims.

What is claimed is:
1. A process for consolidation and densification of multiphase fibrous monolith composite materials comprising:

placing preformed fibrous monolith composite materials formed of one or more filaments each having a central portion of a first uniformly suspended mixture and an outer portion of a second uniformly suspended mixture essentially surrounding the central portion, wherein the second uniformly suspended mixture forms essentially a separate phase between the central portion of the one or more filaments in the composite materials, in a sintering furnace; and heating the fibrous monolith composite materials at a pressure of between about 1 to about 30 psi at a temperature effective to achieve full density of the first and second uniformly suspended mixtures and provide sintered fibrous monolith composite materials.

2. The process of claim 1 wherein the fibrous monolith composite materials are sintered at a temperature below the lowest melting temperature of the first and second uniformly suspended mixtures.

3. The process of claim 1 wherein the fibrous monolith composite materials are sintered at a temperature below at least one of the melting temperatures of the first and second uniformly suspended mixtures.

4. The method of claim 1 wherein in the step of heating the fibrous monolith composite materials the fibrous monolith composite materials are initially heated to at least one interim temperature and held for a period of time before heating to the temperature effective for achieving full density.

5. A method for manufacture of an article comprised of multi-phase fibrous monolithic composite materials comprising the steps of:

a) forming fibrous monolithic composite materials in the form of a filament and including a first material composition generally surrounded by a second material composition;

b) compressing the fibrous monolithic composite materials filament to consolidate and densify the first and second material compositions;

c) forming the compressed fibrous monolithic composite materials filament into a preform of the fibrous monolithic composite materials article; and d) sintering the preform at generally atmospheric pressure at a temperature effective for providing an essentially fully dense, sintered fibrous monolithic composite materials article.

6. The method of claim 5 wherein the preform is sintered at a temperature below a lowest melting temperatures of the first and second material compositions.

7. The method of claim 5 wherein the preform is sintered at a temperature lower than a melting temperature of at least one of the first and second material compositions.

8. The method of claim 5 wherein during sintering the pressure is between about 1 to about 30 psi.

9. The method of claim 5 wherein in the step of sintering the fibrous monolith composite materials the fibrous monolith composite materials are heated at a controlled rate to at least one interim temperature and held for a period of time.

* * * * *